(12) United States Patent
Gunsing

(10) Patent No.: US 9,611,955 B2
(45) Date of Patent: Apr. 4, 2017

(54) REINFORCED FLEXIBLE PIPE

(71) Applicant: IHC HOLLAND IE B.V., Sliedrecht (NL)

(72) Inventor: Theodorus Wilhelmus Maria Gunsing, Renkum (NL)

(73) Assignee: IHC Holland IE B.V., Sliedrecht (NL)

( * ) Notice: Subject to any disclaimer, the term of this patent is extended or adjusted under 35 U.S.C. 154(b) by 191 days.

(21) Appl. No.: 14/352,834

(22) PCT Filed: Oct. 17, 2012

(86) PCT No.: PCT/NL2012/050722
§ 371 (c)(1),
(2) Date: Apr. 18, 2014

(87) PCT Pub. No.: WO2013/058649
PCT Pub. Date: Apr. 25, 2013

(65) Prior Publication Data
US 2014/0251486 A1    Sep. 11, 2014

(30) Foreign Application Priority Data

Oct. 21, 2011  (NL) .................................... 2007637

(51) Int. Cl.
*F16L 9/14* (2006.01)
*F16L 9/00* (2006.01)
(Continued)

(52) U.S. Cl.
CPC ............ *F16L 11/08* (2013.01); *F16L 11/081* (2013.01); *F16L 11/085* (2013.01); *F16L 11/12* (2013.01); *F16L 57/06* (2013.01)

(58) Field of Classification Search
CPC ........ F16L 11/08; F16L 11/081; F16L 11/085; F16L 11/12; F16L 57/06
(Continued)

(56) References Cited

U.S. PATENT DOCUMENTS

| 149,263 | A | * | 3/1874 | Stephens | ................. | F16L 59/12 |
| | | | | | | 138/147 |
| 394,398 | A | * | 12/1888 | Riley | ...................... | F16L 58/16 |
| | | | | | | 138/145 |

(Continued)

FOREIGN PATENT DOCUMENTS

| DE | 84 37 910 | 4/1985 |
| EP | 1 877 689 | 9/2010 |
| GB | 1 573 189 | 8/1980 |

OTHER PUBLICATIONS

International Search Report dated Nov. 28, 2012, corresponding to PCT/NL2012/050722.

*Primary Examiner* — Paul R Durand
*Assistant Examiner* — Vishal Pancholi
(74) *Attorney, Agent, or Firm* — NLO; Catherine A. Shultz; Minerva Rivero

(57) ABSTRACT

A flexible conduit for transporting abrasive slurry, includes a flexible tubular body, such as rubber tube, and a plurality of wear-resistant rings provided in the body along the length of the conduit for protecting the inner surface of the body against abrasive action of the slurry, wherein at least one ring of the plurality of rings includes an indentation for engaging the tubular body in a form closed manner, and wherein the indention is arranged with the ring such that radial movement of the ring with respect to the conduit is prevented.

16 Claims, 2 Drawing Sheets

(51) Int. Cl.
    *F16L 11/08*    (2006.01)
    *F16L 57/06*    (2006.01)
    *F16L 11/12*    (2006.01)

(58) Field of Classification Search
    USPC .................................. 138/146, 147, 153, 174
    See application file for complete search history.

(56) References Cited

U.S. PATENT DOCUMENTS

| | | | | |
|---|---|---|---|---|
| 485,809 | A * | 11/1892 | Jones | ...................... F16L 9/147 |
| | | | | 138/143 |
| 2,330,651 | A | 9/1943 | Welger | |
| 3,169,552 | A | 2/1965 | Fawick | |
| 3,885,594 | A * | 5/1975 | Tanaka | .................. B29C 53/607 |
| | | | | 138/129 |
| 4,461,324 | A | 7/1984 | Schneider | |
| 4,537,224 | A | 8/1985 | Sumitani et al. | |
| 4,587,145 | A * | 5/1986 | Kanao | .................. B29C 53/582 |
| | | | | 138/129 |
| 6,244,303 | B1 * | 6/2001 | Adams | .................. F16L 11/081 |
| | | | | 138/122 |
| 6,739,355 | B2 * | 5/2004 | Glejbøl | .................. F16L 11/16 |
| | | | | 138/133 |
| 6,889,717 | B2 * | 5/2005 | Coutarel | ................. F16L 11/16 |
| | | | | 138/135 |
| 2008/0283139 | A1 | 11/2008 | Knol | |

* cited by examiner

REINFORCED FLEXIBLE PIPE

BACKGROUND

The present invention relates to a flexible conduit for transporting abrasive slurry, comprising a flexible tubular body, such as a rubber tube, and a plurality of wear-resistant rings provided in the body along the length of the conduit for protecting the inner surface of the body against abrasive action of the slurry. This abrasive action may include abrasion, erosion and cutting of sharp edges of pieces of e.g. rock.

U.S. Pat. No. 4,537,224 A relates to a rubber tube for dredging work embedded in and used in a pipe-line used for dredging work in the sea or river. This rubber tube has a tubular body made of rubber having a plurality of strengthening clothes embedded therein, and a plurality of metal rings axially arranged in a suitably spaced relation which are embedded in an inner peripheral surface of said tubular body and which inner peripheral surface forms a part of the inner peripheral surface of said tubular body. The metal rings have their joined surface with the tubular body placed in parallel to the axis and axial both ends thereof made thin in wall-thickness. Thereby, a contact area between the metal ring and the tubular body is increased to strengthen a bonding force and minimize a peeling off of the joined surface between both ends of the metal rings and the tubular body. A wire 30 is tightened between annular ribs 32 and 33 (FIG. 5). The bonding between the metal rings 26 and the rubber tube is strengthened by these annular ribs 32, 33 in connection with compressive force acting axially on the rubber tube 21. There is a need for a rubber tube wherein bonding between the metal ring and the tubular body is improved in radial direction rather than the axial direction.

DE8437910 relates to a rubber hose with a hose wall wherein the metal rings are embedded which metal rings overlap in axial direction of the hose. The metal rings do not have any indentation. The metal rings seem not wear resistant itself since the metal rings are embedded in a rubber layer and have for their purpose to enable the hose to withstand high external pressure.

Such a flexible conduit for transporting abrasive slurry is known from GB 1573189 A which relates to a reinforced rubber hose primarily for use with slurry or a bulky solid in liquid.

A dredge hoses, which is a flexible conduit for transporting abrasive slurry, is inside particularly sensitive to wear when slurry with sharp particles is transported. For that reason the elastomeric wear layer in the hose is provided with metal wear rings. These metal wear rings are adhered or vulcanized into the elastomeric wear layer. Rubber hoses used in suction and pressure lines for dredgers are subject to a considerable amount of wear as the material conveyed there-through cuts the inner wall. To counteract such damage, hoses are known with an internal wear and incision resisting layer of rubber of a thickness of 50 mm or above, or overlapping inserts of conical shape are secured by screw means passing through the wall of the hose are used. The thick layer of rubber is often destroyed in a short time and the lining of steel inserts is expensive and only effective with suction hoses.

This invention of GB 1573189 A seeks to provide a rubber hose for use in conveying bulky and angular solids and which can be subject to suction or pressure and therefore provides a reinforced rubber hose with an inner wall comprising a layer of rubber in which metal insert bodies are embedded the inserts each being of a width substantially equal to the width of the layer of rubber and lying in or immediately beneath the surface of the inner wall, a reinforcement being provided over said layer with an outer cover over the reinforcement. The inserts are firmly embedded in the layer of rubber, and are preferably in the form of annular rings or helical coils extending along the length of the hose. The inserts are resistant to the action of the substance being conveyed and therefore to some extent prevent same from penetrating the rubber to any appreciable depth. On the other hand, the longitudinal spaces between adjacent inserts are completely filled with a resistant rubber and are sufficiently wide to ensure that the hose will retain flexibility. These required spaces to obtain an acceptable flexibility however do result in according unprotected areas of the hose wherein still abrasive particles may penetrate to a certain depth.

In addition EP 1 877 689 B1 relates to a flexible pipe for transporting abrasive slurry, comprising a tubular body of a flexible polymer, such as rubber, and a multitude of coaxial, wear-resistant rings provided in the polymer along the length of the tube, which rings and which tubular body have substantially the same internal diameter. The wear-resistant rings function to slow down the wearing process, for example by preventing sharp objects in the slurry cutting through the rubber wearing layer over a large distance. Said rings are usually formed of steel plate, cut, rolled and welded. Common kinds of steel are used, but also high-tensile and wear-resistant kinds, such as Creusabro™ and Hardox™.

The object of the invention of EP 1 877 689 B1 is to provide a flexible pipe which is more resistant to wear and damage. Therefore, the thickness of the rings near their inner circumference is to that end smaller over at least part of their circumference than the thickness of the rings near their outer circumference. Various properties of the pipe can be improved by using this configuration of the rings, such as the bending radius, the life and the stiffness. In particular the anchoring of the rings in the pipe is improved in this manner. However, the thickness of the rings near their inner circumference being smaller does result in an increase of unprotected area of the hose wherein still abrasive particles may penetrate to a certain depth. In addition, flexibility of the flexible pipe is less controllable during the operational life of the flexible pipe because the amount of rubber between adjacent rings keeps on changing during life of the flexible pipe.

In general the metal rings used in known dredge hoses are hardened or cast iron, produced in different cross sections. When these known rings break, parts thereof easily break out of the body. These broken out parts then flow with the slurry and may damage a downstream apparatus. In addition, the hose will worn out faster without complete wear rings.

SUMMARY OF THE INVENTION

The invention aims at least partially solve a problem associated with known flexible conduits for transporting abrasive slurry.

Another object of the invention is to improve the flexibility of the flexible conduit during its operational life.

Yet another object of the invention is to provide a conduit with an improved operational life.

According to a first aspect of the invention this is realized with a flexible conduit wherein at least one ring of the plurality of rings comprises an indentation for engaging the tubular body in a form closed manner. This provides the possibility of an improved retaining of the ring, and/or broken off parts of the ring in the body. This improved retaining is present even when the hose is bended or erected. Also, the ring having an indentation prevents separation of parts of the flexible tubular body, specifically the part of the body that extends in the indentation. In addition, the ring having an indentation, saves weight, in practice 15% to 25%, which is beneficial when constructing a floating hose because less buoyancy is needed or even more rings may be provided with the body. The indention is arranged with the ring such that radial movement of the ring with respect to the conduit is prevented. This enables to prevent release of broken parts of a ring from the body into the slurry.

In an embodiment, the indention is arranged with the ring such that the indentation faces towards an adjacent ring. This provides the possibility of increasing the body volume between adjacent rings without increasing exposure of the inner surface to abrasive action. This provides an improved flexibility of the flexible conduit without compromising on protection against abrasive action.

In an embodiment, the indentation extends in axial direction of the body. This even more increases the body volume between adjacent rings without increasing exposure of the inner surface to abrasive action.

In an embodiment of the flexible conduit, the indention extends circumferential along the entire ring. This even more enables to prevent, or even more prevents, release of broken parts of a ring from the body into the slurry. In addition, this even more increases the body volume between adjacent rings without increasing exposure of the inner surface to abrasive action.

In an embodiment, the indentation extends continuously. This even more enables to prevent, or even more prevents, release of broken parts of a ring from the body into the slurry. In addition, this even more increases the body volume between adjacent rings without increasing exposure of the inner surface to abrasive action.

In an embodiment of the flexible conduit, the indentation extends between a ring inner portion and a ring outer portion.

In an embodiment, the indentation extends near the outer circumference of the ring.

In an embodiment, the indentation is delimited by a bevelled face.

In an embodiment, the at least one ring comprises several indentations.

In an embodiment of the flexible conduit, the at least one ring comprises a pair of opposite indentations. This even more improves the flexibility of the flexible conduit as a whole.

In an embodiment of the flexible conduit, the indentations of two adjacent rings at least partly face for increasing the flexible body volume between the two adjacent rings.

In an embodiment of the flexible conduit, the flexible body comprises a reinforcement layer which extends with respect to the indentation for maintaining the form closed engagement of the flexible body and the at least one ring of the plurality of rings when the conduit is pressurized. This even more enables to prevent release of broken parts of a ring from the body into the slurry.

In an embodiment of the flexible conduit, the layer extends between two adjacent rings, preferably extends over at least two adjacent rings. This improves even more the effect of the layer.

In an embodiment of the flexible conduit, the layer extends between the ring outer portions of two adjacent rings. This improves even more the effect of the layer.

In an embodiment of the flexible conduit, the layer is pretensioned. This improves even more the effect of the layer when the conduit is pressurized.

The invention further relates to a use of a flexible conduit according to the invention, to transport a slurry, preferably an abrasive slurry.

The invention further relates to a device comprising one or more of the characterising features described in the description and/or shown in the attached drawings.

The invention further relates to a method comprising one or more of the characterising features described in the description and/or shown in the attached drawings.

The various aspects discussed in this patent can be combined in order to provide additional advantages.

DESCRIPTION OF THE DRAWINGS

The invention will be further elucidated referring to a preferred embodiment of a flexible conduit shown in the drawing wherein shown in.

DETAILED DESCRIPTION OF EMBODIMENTS

Figure 1:
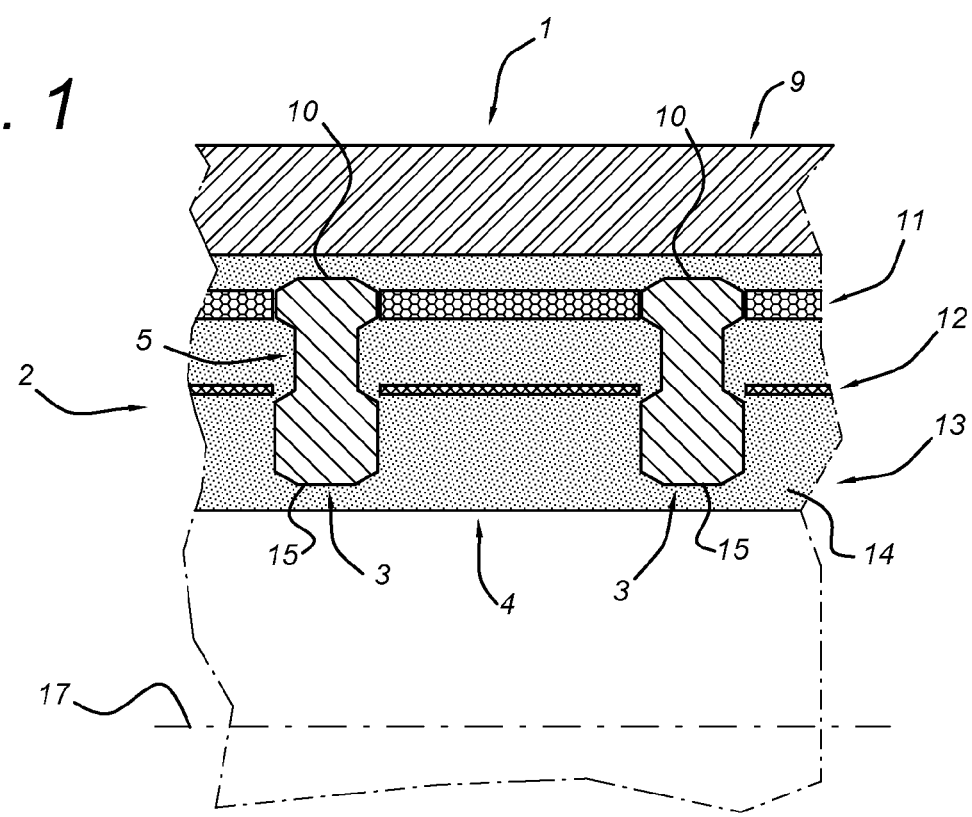
FIG. 1 a side view of a detail in cross section.

The invention will be described in detail referring to a preferred embodiment of a flexible conduit 1 shown (or details thereof shown) in the drawings 1-3.

FIG. 1 depicts a flexible conduit 1 for transporting abrasive slurry. The conduit 1 has a flexible tubular body, in this case a rubber tube 2 however any other suitable flexible polymer or other material is conceivable. A plurality of wear-resistant rings 3 are provided in the body 2 along the length of the conduit 1. The rings 3 are suitable for protecting the inner surface 4 of the body 2 against abrasive action of the slurry. These rings 3 are typically made of steel, however any other conceivable material is conceivable. The rings 3 are co-axial with respect to the longitudinal axis 17 of the conduit 1. A ring 3, specifically several rings 3, more specifically all rings 3 of the plurality of rings 3 comprise an indentation 5 for engaging the tubular body 2 in a form closed manner. Form closed is here to say that the ring 3 may not be separated from the body by overcoming friction. Instead, the ring 3 may only be separated upon deformation of, most likely, the flexible body.

The indention 5 is arranged with the ring 3 such that radial movement of the ring 3 with respect to the conduit 1, specifically with respect to the body 2, is prevented. The indentation 5 extends in axial direction of the body 2, which means along the longitudinal axis 17 of the conduit 1. Here, the indention 5 extends circumferential along the entire ring 3, in which case the indentation 5 extends continuously. However, the indentations 5 may extend. Optionally, a number of indentations 5 may be provided with the ring 3, which indentations 5 each extend over a different part of the circumference of entire ring 3. These parts may partly overlap.

The indentation 5 extends between a ring inner portion 6 and a ring outer portion 7. Here, the indentation 5 extends near the outer circumference of the ring 3. This enable the ring 3 to have a relative large ring inner portion 6 which results in an improved operational life of the ring 3 while maintaining the improved retaining of the ring 3 in the body 2 during operational life of the conduit 1.

Here, the indentation is delimited by a bevelled face 8 on radial opposing sides of the indentation 5 which gives the indentation a trapezium shape delimited by the ring 3 and the envelop of the ring 3.

Figure 2:
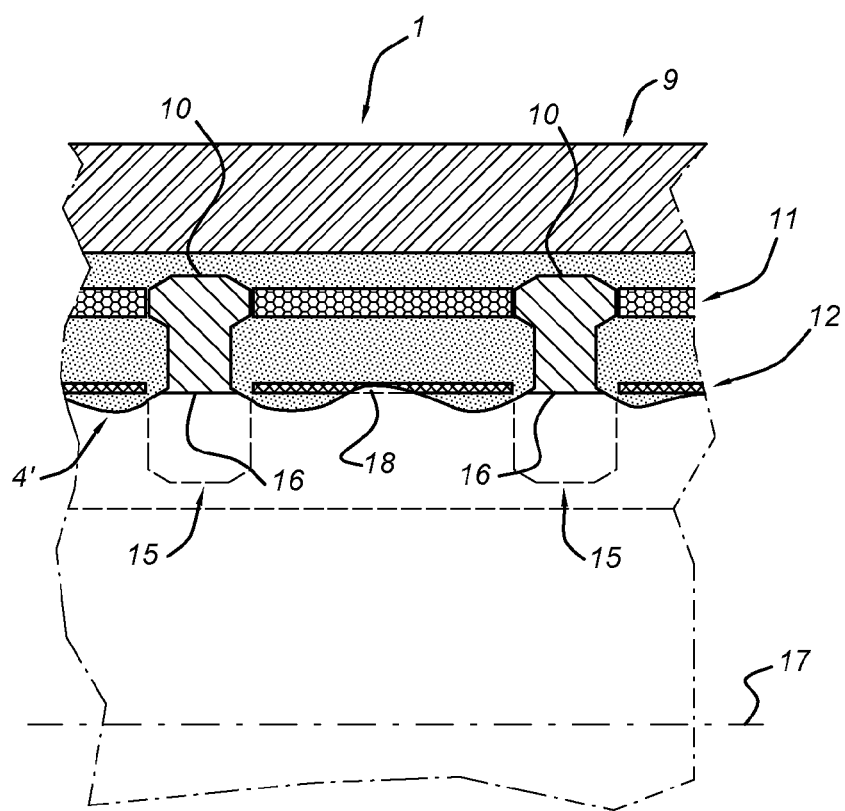
FIG. 2 the view of FIG. 1 with a part of the body worn away.

In FIGS. 1 and 2 is shown that the indention 5 is arranged with the ring 3 such that the indentation 5 faces towards an adjacent ring 3. Here, the indentations 5 of two adjacent rings 3 do entirely overlap. It is conceivable that the indentations 5 partly overlap for increasing the flexible body volume between the two adjacent rings 3.

In FIG. 2 is shown that a part of the body 2 is worn away. The inner surface 4 of the body is shifted during use to worn inner surface 4'. The rings 3 have been partly worn away as well, up to inner surface 16 as shown. At least the outer ring portions 7 retain the ring 3 with the body 2.

The body 2 comprises a pressure resistance radial wrapped inner layers 11 to prevent movement of the rings 3 to the outside of the conduit 1 and deformation of the flexible body 2 under influence of pressure within the conduit 1. This layer 11 is known per se and may comprise e.g. metal wires and/or aramide fibres. Here, the flexible body 2 comprises the reinforcement layer 11 which extends with respect to the indentation 5 for maintaining the form closed engagement of the flexible body 2 and the at least one ring 3 of the plurality of rings when the conduit 1 is pressurized. The layers 11 extends between two adjacent rings 3. The outer layer 11 extends between ring outer portions 7 of two adjacent rings 3 and maintains the material of the flexible body 2 in the indentations 5 of the adjacent rings. The outer layer 11 may be pretensioned to even more force the material of the flexible body 2 in the indentations 5 of the adjacent rings.

An inner layer 12 extends between ring inner portions 6 of two adjacent rings 3. The inner layer 12 is provided with markings 18 that contrast with the material of the flexible body 2. These markings become laid open once the flexible body 2 is worn away to a certain extend. These markings then provide a visible indication. It is conceivable that other wear indicators are integrated in the inner layer 12 like e.g. an electrical wire which breaks to indicate wear.

The conduit 1 is here provided with a conduit outer layer 9 which surrounds conduit 1 and adjoins the flexible body 2. The ring outer face 10 faces the outer layer 9. The ring inner face 15 faces the interior of the conduit 1.

Figure 3A:
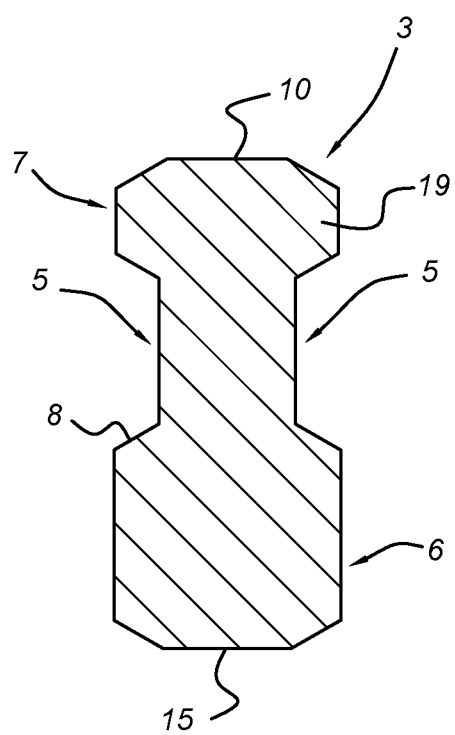
FIGS. 3a and 3b details of rings in cross sectional view.
Figure 3B:
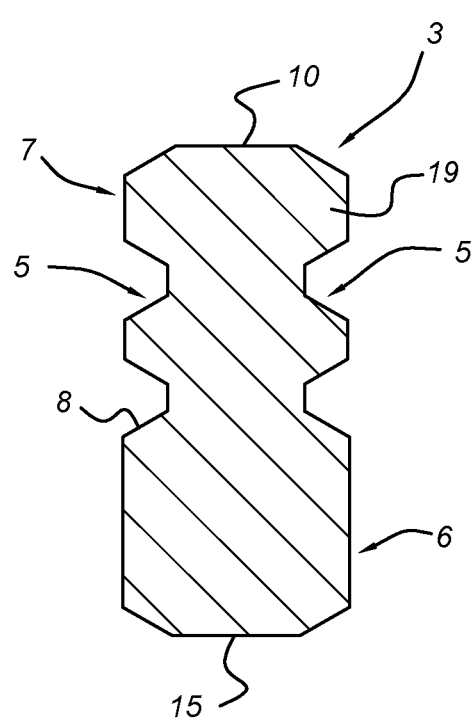

FIG. 3a, 3b show a ring 3 provided with several indentations 5. The ring 3 of FIG. 3a comprises a pair of opposite indentations 5. The ring 3 of FIG. 3b shows two pairs of adjoining indentations 5.

As an example; a floating flexible conduit of about 11800 mm is provided with about 120 wear resistant rings. A known ring weighs about 39 kg whereas a ring according to the invention weighs about 32 kg. Importantly, the floating flexible conduit then saves about 840 kg of weight without compromising wear resisting capabilities.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. Flexible conduit for transporting abrasive slurry, comprising a flexible tubular body, and a plurality of wear-resistant rings provided in the body along the length of the conduit for protecting the inner surface of the body against abrasive action of the slurry, wherein at least one ring of the plurality of rings comprises one or more indentations for engaging the tubular body in a form closed manner, wherein the indention is arranged with the ring such that radial movement of the ring with respect to the conduit is prevented as well as release of broken parts of the at least one ring from the body into the slurry, wherein the indention is arranged with the ring such that the indentation faces towards an adjacent ring;

wherein the one or more indentations extend between a ring inner portion near the inner circumference of the ring and a ring outer portion near the outer circumference of the ring, wherein the radial plane cross-sectional area of the ring inner portion is greater than the radial plane cross-sectional area of the ring outer portion; and wherein the at least one ring co-axial with respect to the longitudinal axis of the conduit, so that a radial plane of the ring is perpendicular to said longitudinal axis.

2. Flexible conduit according to claim 1, wherein the one or more indentations extend in axial direction of the body.

3. Flexible conduit according to claim 1, wherein the one or more indentations extend circumferentially along the entire ring.

4. Flexible conduit according to claim 1, wherein the one or more indentations extend continuously.

5. Flexible conduit according to claim 1, wherein the one or more indentations near the outer circumference of the ring.

6. Flexible conduit according to claim 1, wherein the one or more indentations are delimited by a bevelled face on radial opposing sides of the indentation.

7. Flexible conduit according to claim 1, wherein the at least one ring comprises a pair of opposite indentations.

8. Flexible conduit according to claim 1, wherein indentations of two adjacent rings at least partly face each other.

9. Flexible conduit according to claim 1, wherein the flexible body comprises a reinforcement layer which extends with respect to the indentation for maintaining the form closed engagement of the flexible body and the at least one ring of the plurality of rings when the conduit is pressurized.

10. Flexible conduit according to claim 9, wherein the layer extends between two adjacent rings.

11. Flexible conduit according to claim 10, wherein the layer extends between the ring outer portions of two adjacent rings.

12. Flexible conduit according to claim 9, wherein the layer is pretensioned.

13. Method for transporting a slurry, which comprises: providing a flexible conduit according to claim 1; and transporting the slurry.

14. The method according to claim 13, wherein the slurry is an abrasive slurry.

15. Flexible conduit according to claim 1, wherein the tubular body is a rubber tube.

16. Flexible conduit according to claim 1, wherein the inner circumference of the tubular body is smaller than the inner circumference of the plurality of wear-resistant rings, such that a ring inner face faces the interior of the tubular body.

* * * * *